(12) United States Patent
Diller et al.

(10) Patent No.: US 12,351,255 B2
(45) Date of Patent: Jul. 8, 2025

(54) FIFTH WHEEL HITCH

(71) Applicant: Curt Manufacturing, LLC, Eau Claire, WI (US)

(72) Inventors: Joel D. Diller, Eau Claire, WI (US); Wolfe C. Parzyck, Colfax, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 933 days.

(21) Appl. No.: 17/505,274

(22) Filed: Oct. 19, 2021

(65) Prior Publication Data

US 2022/0119048 A1 Apr. 21, 2022

Related U.S. Application Data

(60) Provisional application No. 63/093,454, filed on Oct. 19, 2020.

(51) Int. Cl.
B62D 53/08 (2006.01)
(52) U.S. Cl.
CPC ................ B62D 53/0842 (2013.01)
(58) Field of Classification Search
CPC ............ B62D 53/0828; B62D 53/0842; B60D 1/075; B60D 1/015; B60D 1/36; B60D 1/44; B60D 1/46; B60D 1/488
USPC ....................................... 280/433, 477, 901
See application file for complete search history.

(56) References Cited

U.S. PATENT DOCUMENTS

| 5,839,745 A | 11/1998 | Cattau |
| 6,065,766 A | 5/2000 | Pulliam |
| 6,135,482 A | 10/2000 | Larkin |
| 6,386,569 B1 | 5/2002 | Wick |
| 6,685,210 B2 | 2/2004 | Lindenman et al. |
| 6,846,000 B2 | 1/2005 | Grinde et al. |
| 6,935,650 B2 | 8/2005 | Grinde et al. |
| D560,143 S | 1/2008 | Crawley et al. |
| D572,633 S | 7/2008 | Crawley et al. |
| 7,475,899 B2 | 1/2009 | Crawley |
| 7,543,837 B2 | 6/2009 | Crawley |
| 7,584,982 B2 | 9/2009 | Fisher |
| 7,828,317 B2 | 11/2010 | Withers et al. |

(Continued)

OTHER PUBLICATIONS

Andersen Hitches, Ultimate 5th Wheel Connection Installation—Andersen Hitches. YouTube, Apr. 5, 2018, [retrieved on Dec. 14, 2021]. Retrieved from internet:, URL: https://www.youtube.com/watch?v=SkjTuq_kc9M>. entire video.

*Primary Examiner* — Christopher B Wehrly
(74) *Attorney, Agent, or Firm* — Shewchuk IP Services, LLC; Jeffrey D. Shewchuk

(57) ABSTRACT

A fifth wheel hitch has a base attachable to a towing vehicle, a seat attachable at a selected elevation above the base, and a kingpin adapter attachable to a kingpin of a trailer so as to permit rotation of the kingpin adapter relative to the kingpin about a kingpin rotation axis. The seat has a mouth which narrows in the longitudinal direction, such as by having a pyramidal shape. A bottom of the kingpin adapter has a shape which can cause both pivoting rotation of the kingpin adapter relative to the kingpin and longitudinal or transverse translational movement of the kingpin adapter and attached kingpin when the towing vehicle is driven to a position with the seat under the bottom of the kingpin adapter and the kingpin is jacked down so the kingpin adapter seats into the seat.

13 Claims, 14 Drawing Sheets

(56) References Cited

U.S. PATENT DOCUMENTS

| | | | |
|---|---|---|---|
| 7,878,525 B2 * | 2/2011 | Andersen | B60D 1/065 |
| | | | 280/439 |
| 8,177,252 B2 | 5/2012 | Tambornino | |
| 8,523,217 B2 | 9/2013 | Andersen | |
| 8,550,485 B2 | 10/2013 | Leech et al. | |
| 8,827,298 B2 | 9/2014 | Diller | |
| 8,925,952 B2 | 1/2015 | Leech et al. | |
| 9,802,452 B1 | 10/2017 | McCall | |
| 9,919,571 B2 | 3/2018 | Pulliam et al. | |
| 10,322,613 B2 | 6/2019 | Pulliam et al. | |
| 2012/0018979 A1 * | 1/2012 | McCoy | B62D 53/0885 |
| | | | 280/433 |
| 2013/0175786 A1 * | 7/2013 | Curl | B62D 53/0871 |
| | | | 280/439 |
| 2020/0047572 A1 | 2/2020 | Fisher et al. | |

* cited by examiner

FIFTH WHEEL HITCH

CROSS-REFERENCE TO RELATED APPLICATION(S)

The present application claims priority from U.S. Provisional Application No. 63/093,454 entitled FIFTH WHEEL HITCH filed Oct. 19, 2020, incorporated herein by reference.

BACKGROUND OF THE INVENTION

Fifth wheel hitches are known in the art. Examples are shown in U.S. Pat. Nos. 6,846,000, 6,935,650, 7,475,899, 7,543,837, 7,584,982, 8,177,252, 8,827,298, D560,143, and D572,633, all owned by the Assignee of the present invention and all incorporated by reference. Fifth wheel trailers include a downwardly-facing pin, called a kingpin, which extends generally vertically on the leading tongue (which can be referred to as a "pinbox" or a "kingpin box") of the trailer. The kingpin extends beneath a horizontally-extending support plate, and many fifth wheel hitches include a horizontally extending skid plate, positioned around a kingpin receiving opening, which during use makes contact with and supports the support plate of the trailer tongue. The tongue weight of fifth wheel trailers is typically heavier than can be handled by a typical ball hitch mounted behind the trailing bumper of the towing vehicle, and fifth wheel hitches are commonly mounted in the bed of a pick-up truck so as to position the trailer load/kingpin generally over the rear axle of the towing pick-up truck. The fifth wheel hitch holds the position of the kingpin while allowing pivoting to accommodate turns. The fifth wheel hitch allows its skid plate to move angularly to a limited degree relative to the fifth wheel base, so the skid plate can remain in flat contact with the support plate as the vehicle traverses over hills, troughs and changes in side slopes of the roadway. Fifth wheel hitches are generally more complicated and expensive than ball hitches. During use of the prior art systems, connection of the kingpin into the hitch can be difficult and time consuming.

Some fifth wheel hitches include an adapter to convert the cylindrical kingpin to a ball and socket type of connection. Examples are shown in U.S. Pat. Nos. 6,135,482, 6,386,569, 9,802,452, 9,919,571 and 10,322,613, incorporated by reference for their teaching of towing vehicles, fifth wheel bases and kingpin and trailer designs. In some prior art adapter-type systems, the adapter must be locked to the kingpin, often with set screws or drilling and bolting, which increases the stress on the trailer's pin box. On some prior art systems, all the rotational and vertical stress will be transferred through a ball and socket type of joint resulting in accelerated wear at the contact point.

With either just the kingpin or using a ball and socket type of adapter, connection alignment is difficult and often requires either the use of a second person to aid in alignment or exiting the driver's seat multiple times to achieve proper connection alignment in both the longitudinal and transverse directions. At the same time, since unintentional disconnection could be catastrophic, the connection method needs to be foolproof and secure. Since failure of the hitch could similarly be catastrophic, the hitch needs to be strong, robust and reliable over years or decades of use. Better fifth wheel hitch designs are needed.

BRIEF SUMMARY OF THE INVENTION

The present invention is a fifth wheel hitch, method of assembling/manufacturing such a fifth wheel hitch, and a method of connecting and/or disconnecting such a fifth wheel hitch to a kingpin of a fifth wheel trailer. The fifth wheel hitch has a base attachable to a towing vehicle and a seat attached at a top of the base. The seat has a mouth which narrows in the longitudinal direction, such as by having a pyramidal shape. A kingpin adapter is attached to a kingpin of a trailer so as to permit rotation of the kingpin adapter relative to the kingpin about a kingpin rotation axis. A bottom of the kingpin adapter has a shape which can preferably cause both pivoting rotation of the kingpin adapter relative to the kingpin and longitudinal or transverse translational movement of the kingpin adapter and attached kingpin when the towing vehicle is driven to a position with the seat under the bottom of the kingpin adapter and the kingpin is jacked down so the kingpin adapter seats into the base. For instance, the bottom of the kingpin adapter can have a pyramidal shape which mates into the seat.

Figure 1:
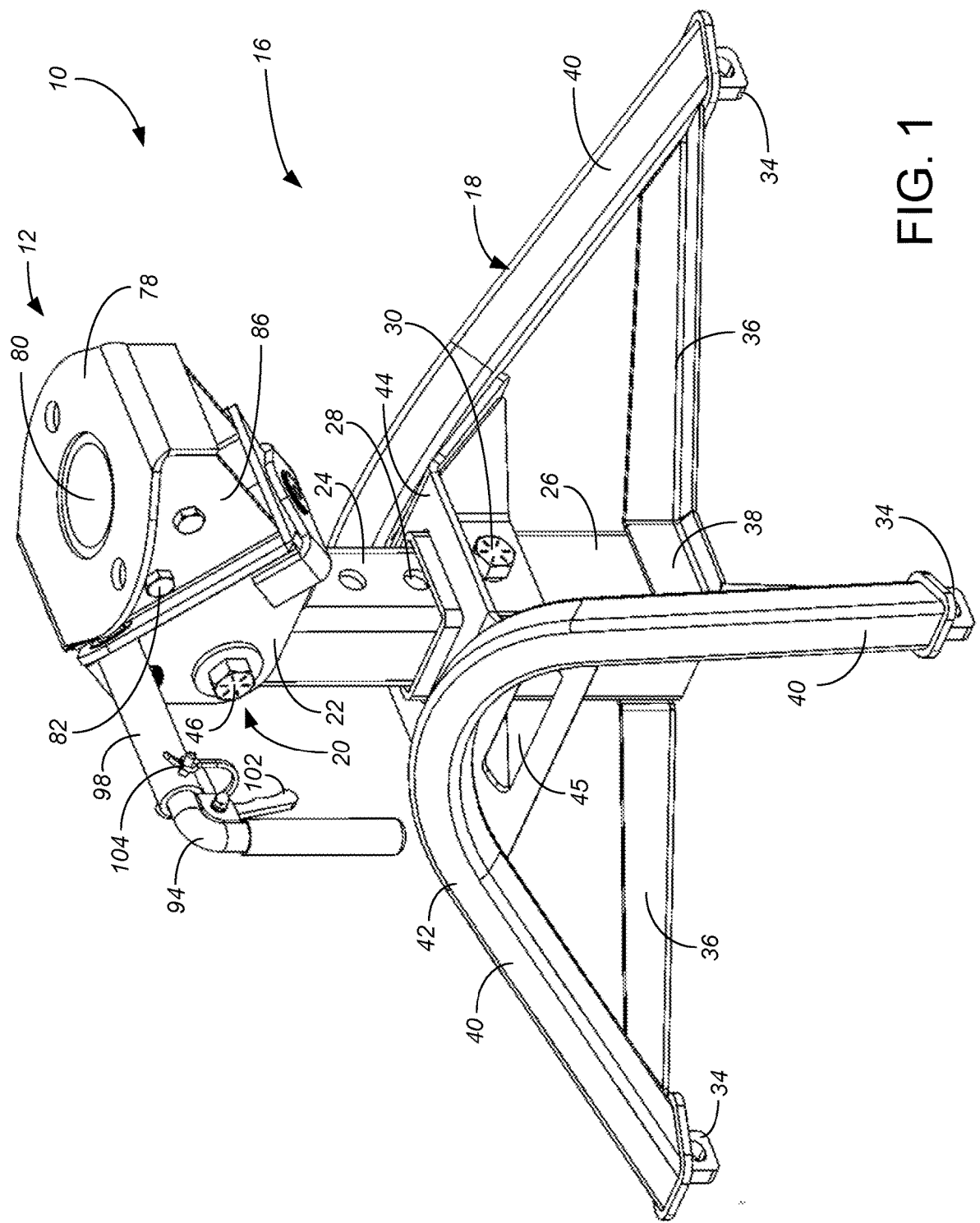
FIG. 1 is a perspective view, from the upper-rear-left, of a first preferred assembled embodiment of a fifth wheel hitch in accordance with the present invention.
Figure 2:
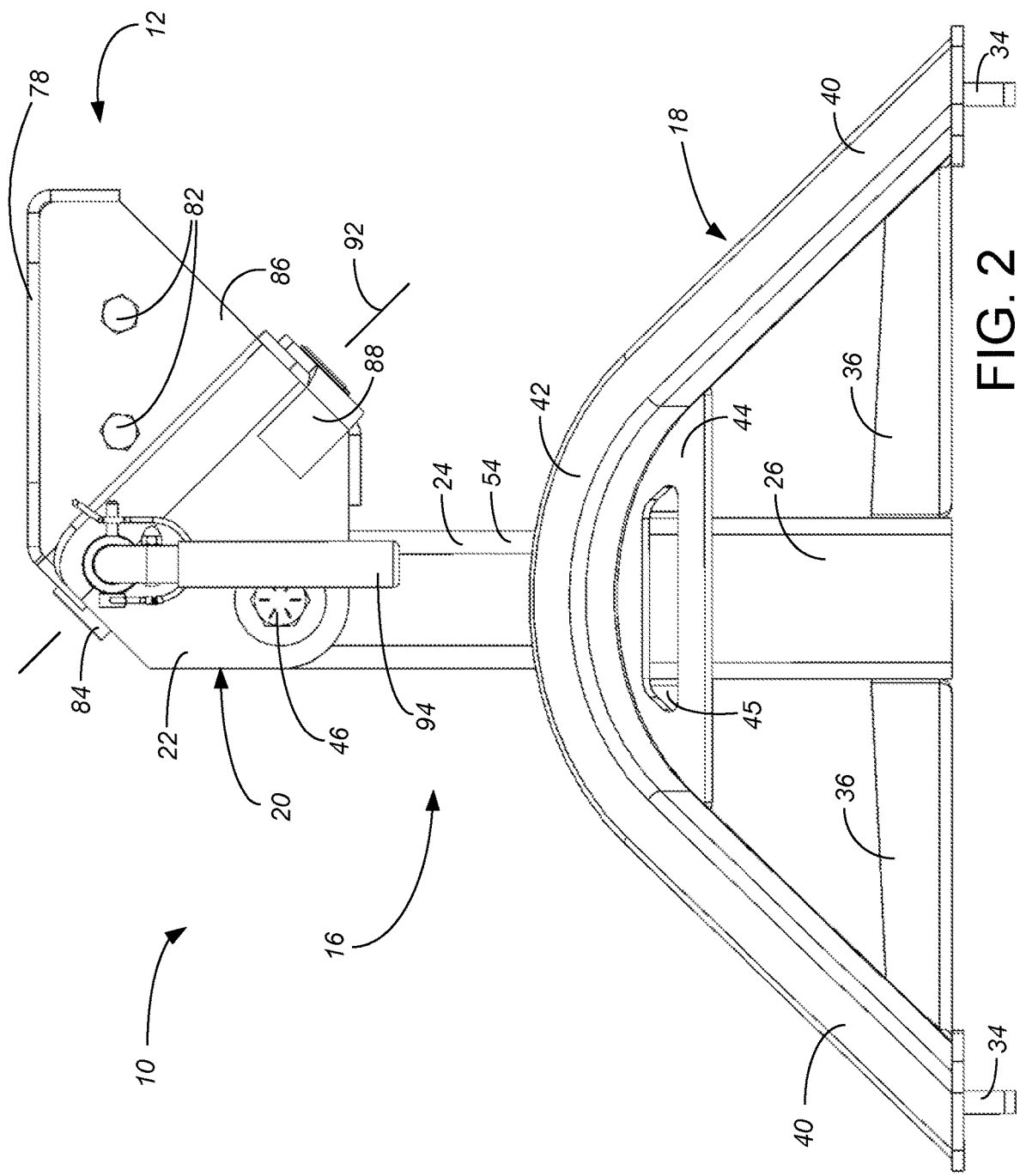
FIG. 2 is a side elevational view of the assembled fifth wheel hitch of FIG. 1.
Figure 3:
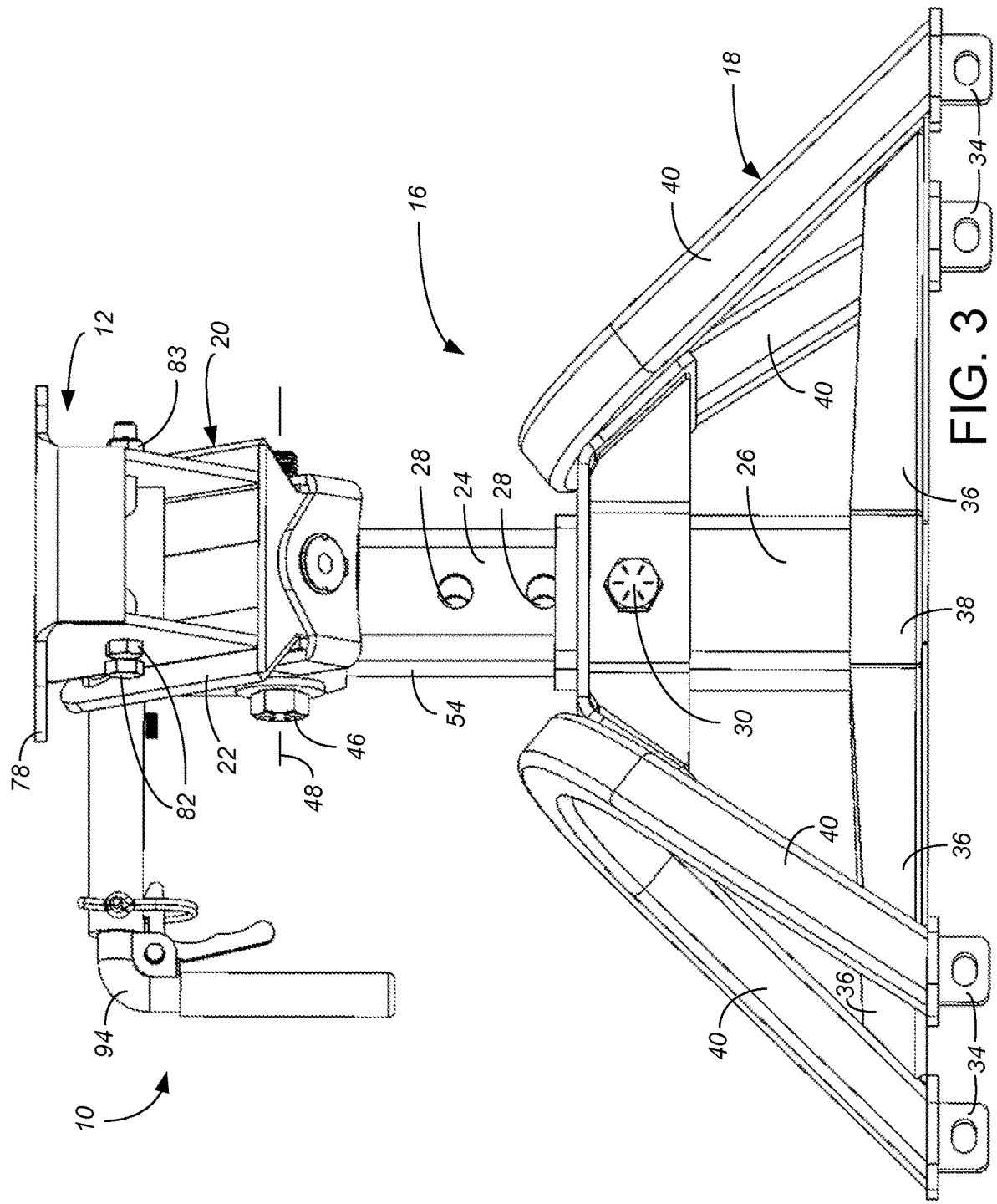
FIG. 3 is an elevational view from mostly rearward but slightly to the left of the hitch longitudinal center plane, of the assembled fifth wheel hitch of FIGS. 1 and 2.
Figure 4:
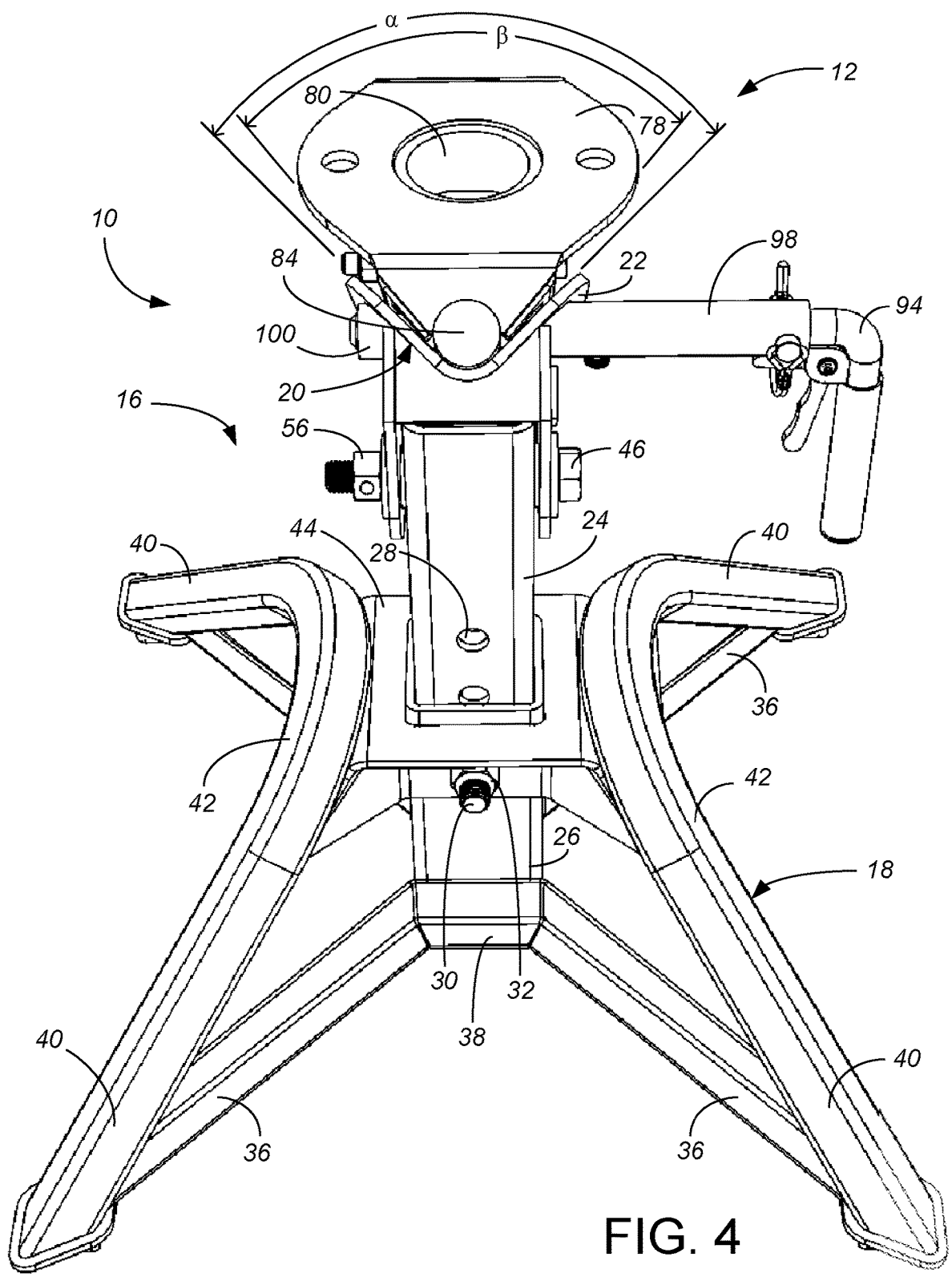
FIG. 4 is a perspective view from the hitch longitudinal center plane, looking downward at an angle along the pivoting axis between the adapter and the seat, of the assembled fifth wheel hitch of FIGS. 1-3.
Figure 5:
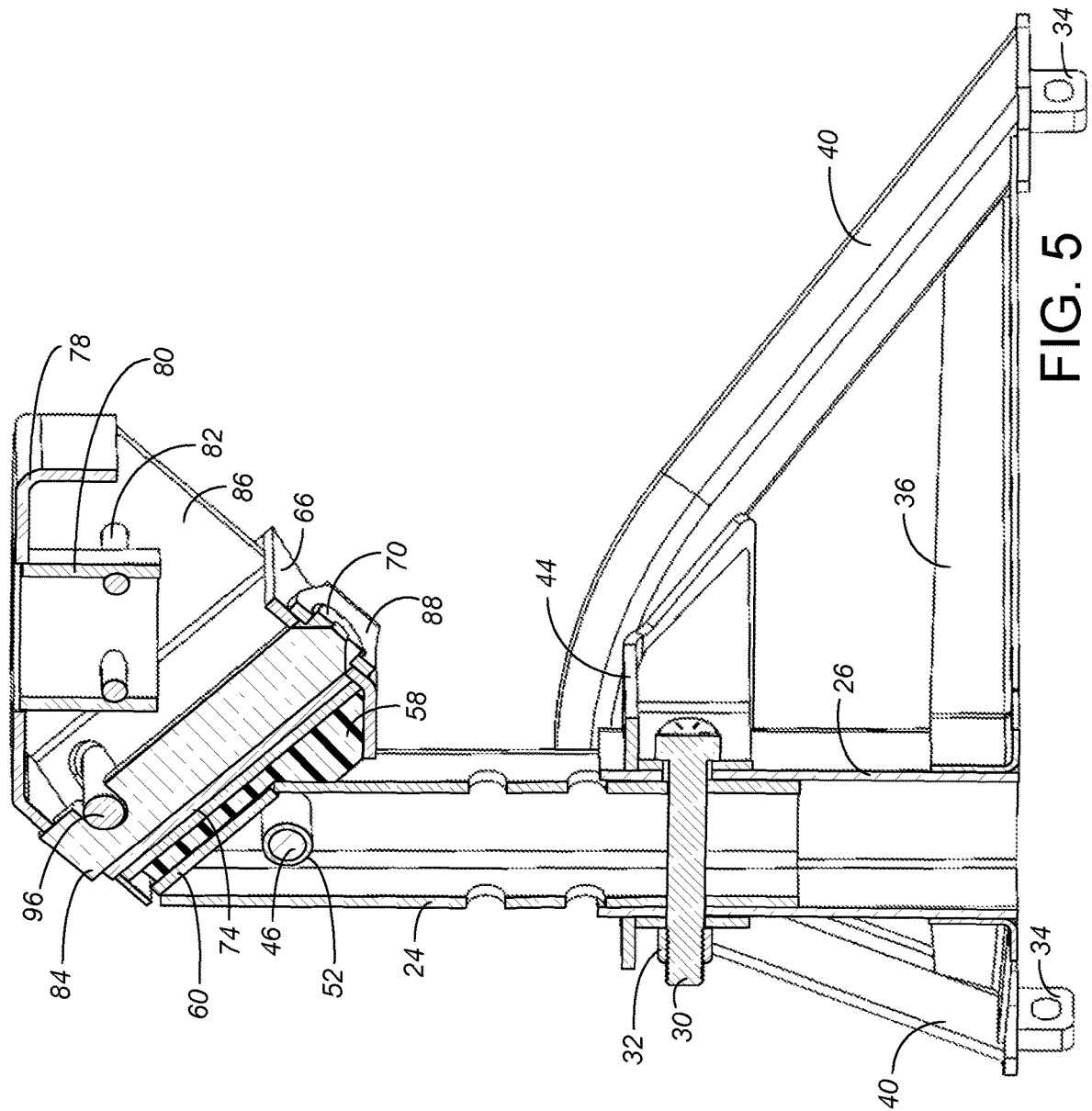
FIG. 5 is an elevational view, from rearward and to the left, of the assembled fifth wheel hitch of FIGS. 1-4 vertically sectioned at the hitch longitudinal center plane.
Figure 6:
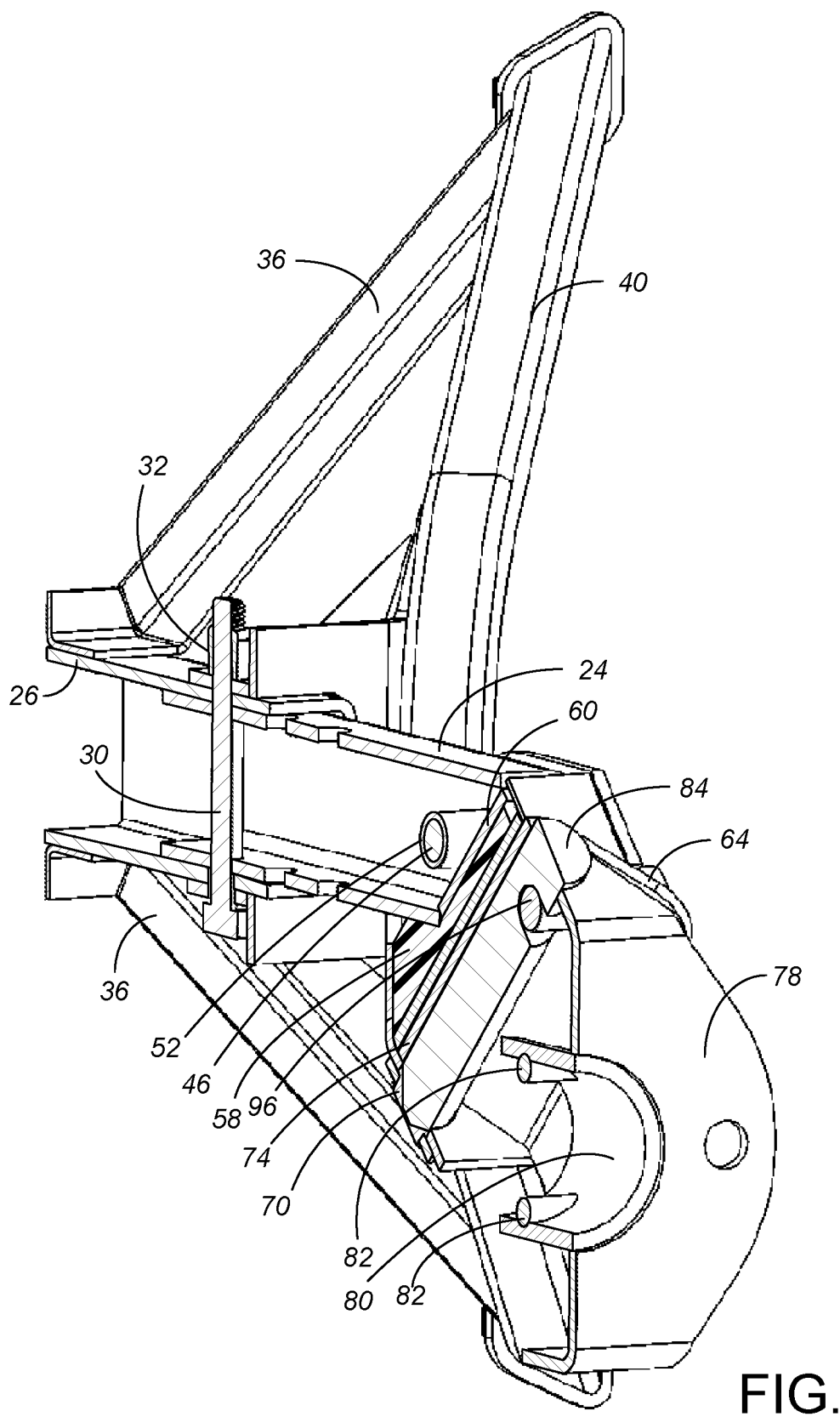
FIG. 6 is a view of the vertically sectioned assembled fifth wheel hitch of FIG. 5, looking downwardly and from the left.
Figure 7:
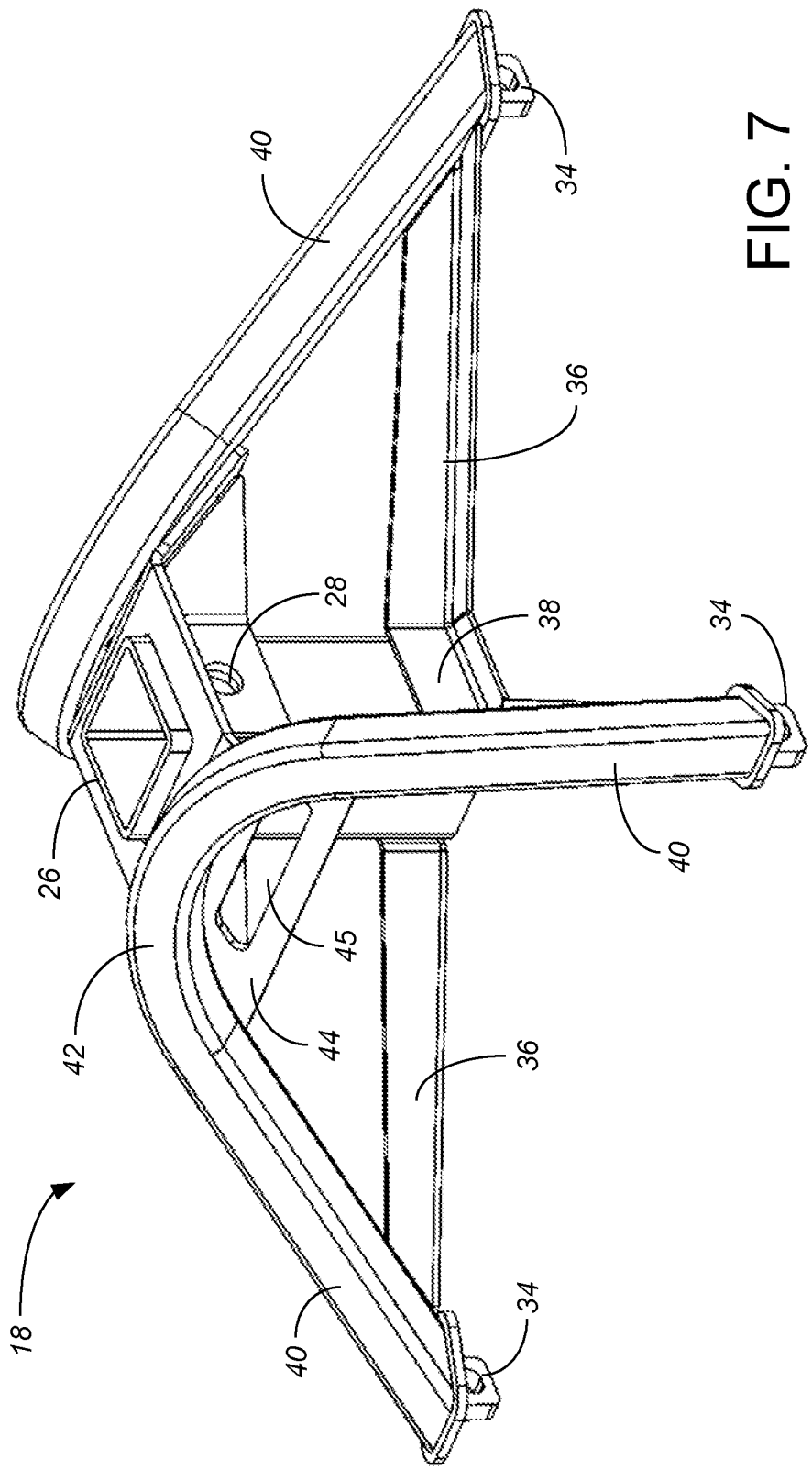
FIG. 7 is a perspective view of the base weldment of the fifth wheel hitch of FIGS. 1-4.
Figure 8:
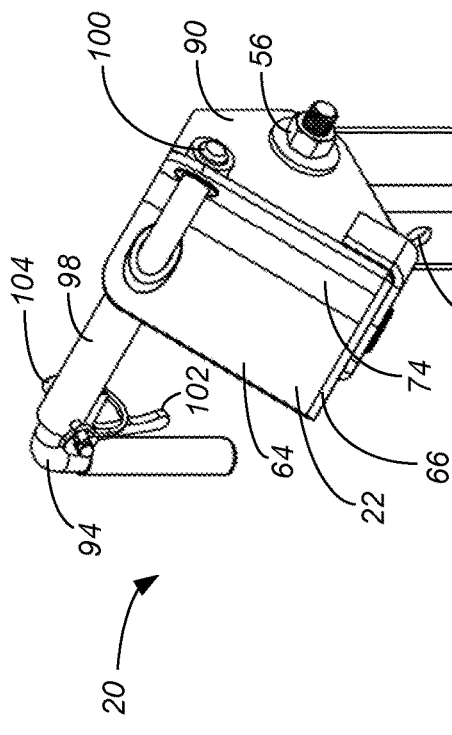
FIG. 8 is a perspective view of the seat assembly of the fifth wheel hitch of FIGS. 1-4 from the upper-rear-right.
Figure 10:
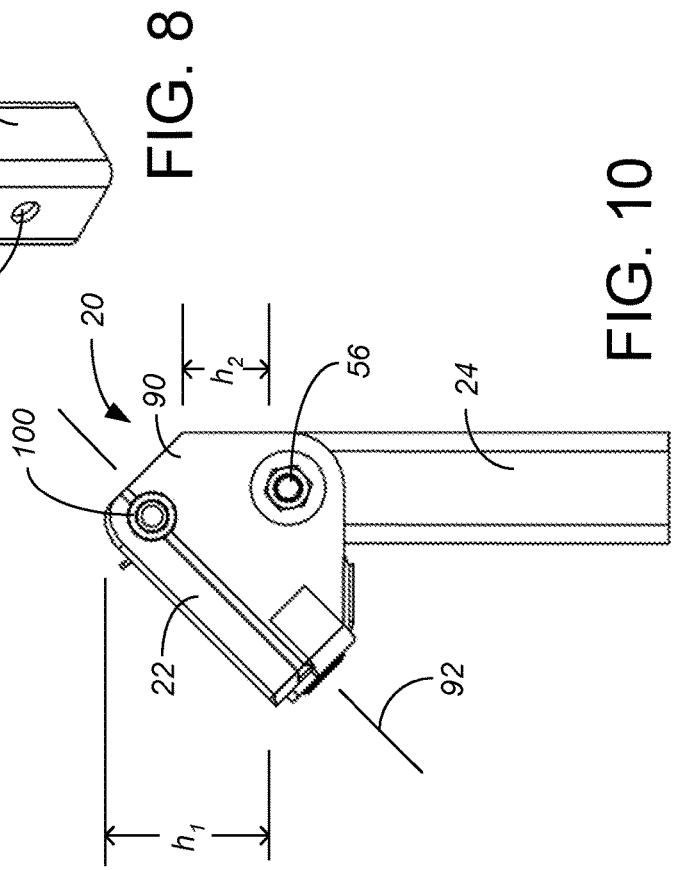
FIG. 10 is a side elevational view of the seat assembly of FIGS. 8 and 9.
Figure 11:
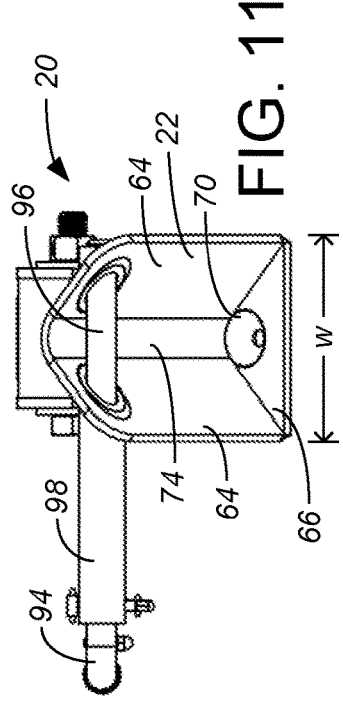
FIG. 11 is a plan view from above of the seat assembly of FIGS. 8-10.
Figure 9:
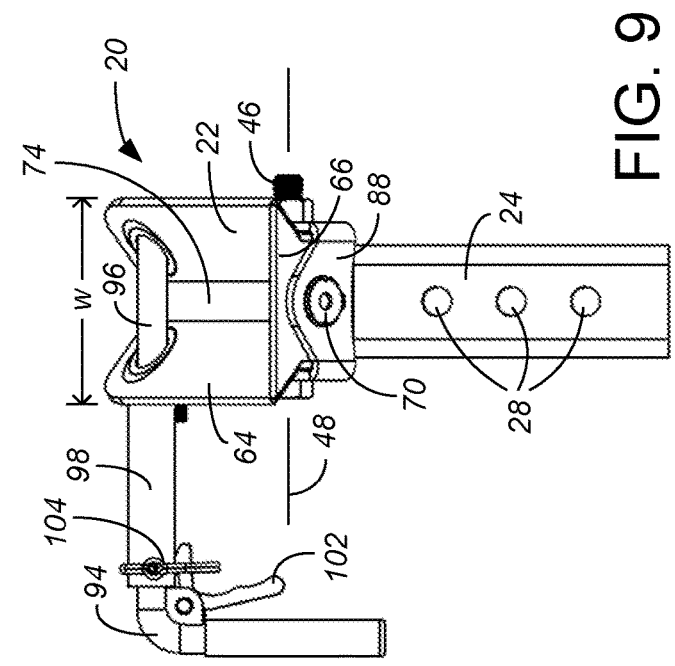
FIG. 9 is a rear elevational view of the seat assembly of FIG. 8.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

A first preferred embodiment of the fifth wheel hitch 10 of the present invention is shown with reference to FIGS. 1-15. FIGS. 1-4 show the preferred fifth wheel hitch 10 in a fully assembled condition, but not showing the pickup truck or the kingpin or fifth wheel trailer. In general, the fifth wheel hitch 10 includes a kingpin adapter 12, which is mounted on the kingpin 14 (shown only in dashed lines in FIG. 15) of the trailer, and a base assembly 16. The base assembly 16 preferably includes a base weldment 18 which is mounted in the bed of the pickup truck and a seat assembly 20 which is mounted in the base weldment 18. The seat assembly 20 provides a seat 22 for the kingpin adapter 12. Because the seat 22 is, during towing use, underneath the kingpin adapter 12 and supporting the kingpin adapter 12, the seat 22 can also be referred to as a lower weldment and the kingpin adapter 12 can also be referred to as an upper weldment. The seat assembly 20 can also be referred to as a lower coupler assembly.

The purpose of having the seat assembly 20 be a separate component than the base weldment 18 is to allow the user to adjust the height of the seat 22 relative to the bed of the pickup truck, with the preferred embodiment allowing the user to select between low, middle and high positions of the seat 22. For instance, the seat assembly 20 can include an inner riser tube 24, which mates in a telescoping fashion with a vertically extending outer tube 26 of the base weldment 18. By having a plurality of corresponding sets of bolt holes 28 between the inner riser tube 24 and the outer tube 26, the user can align two sets of bolt holes 28 and set the height of the seat 22 relative to the outer tube 26 by insertion of an elevation setting bolt 30 shown in FIGS. 1 and 3 through the aligned bolt holes 28. After the bolt 30 is inserted, the user fully secures the seat assembly 20 to the base 18 by tightening a threaded nut 32, shown in FIG. 4, onto the bolt 30. Many other types of arrangements could be equivalently used to allow the user to select the height of the seat 22 above the bed of the pickup truck, having two, three or more selectable elevations. The most preferred inner riser tube 24 is formed from 3×3 inch (76×76 mm), 0.25 inch (6 mm) wall thickness steel tube stock, fitting inside an outer tube 26 formed from 3.5×3.5 inch (89×89 mm), 0.225 inch (6 mm) wall thickness steel tube stock, connected using a bolt 30 with a 1 inch (25 mm) shank diameter.

The base weldment 18 allows the user to secure the fifth wheel hitch 10 to the bed of the towing vehicle. For instance, the base weldment 18 can include four base foot plates 34 allowing attachment in the bed of a pickup truck over the rear axle by using existing rail systems (not shown) or other mounting methods. Exemplary mounting structures are shown in U.S. Pat. Nos. 5,839,745, 6,065,766, 6,685,210, 7,828,317, 8,550,485 and 8,925,952, all incorporated by reference. A typical mounting arrangement positions the four base foot plates 34 roughly in a two foot by two foot (600×600 mm) square pattern.

The preferred base weldment 18 connects the bottom of the outer tube 26 to the four base foot plates 34 using four lower support arms 36, one of which extends horizontally between each foot plate 34 and the bottom of the outer tube 26. In the preferred embodiment, the four lower support arms 36 are provided by two lower supports 38 each formed of plate steel cut, bent and welded to the outer tube 26 so each lower support 38 provides two of the lower support arms 36. The preferred base weldment 18 connects the top of the outer tube 26 to the four base foot plates 34 using four sloping arms 40, one of which extends at an angle between each foot plate 34 and the top of the outer tube 26. In the preferred embodiment, the four sloping arms 40 are provided by forming two main body tubes 42 each curved out of square steel tube stock (1.5×1.5 inches (38×38 mm) and $\frac{1}{8}^{th}$ inch (3 mm) wall thickness) and welded to the outer tube 26 so each main body tube 42 provides two of the sloping arms 40. A tube support plate 44, preferably formed of sheet metal and cut, bent and welded to the outer tube 26 and to both main body tubes 42, helps to secure the connection between the main body tubes 42 and the outer tube 26 and also provides two hand hold grasping locations 45 for the user to lift the base weldment 18. The base weldment 18 must transfer all the towing forces between the inner riser tube 24 and the outer tube 26 to the feet 34, and the main consideration is that the outer tube 26 and the inner riser tube 24 be held strongly and rigidly in a vertical orientation. Many alternative constructions could be used for the base weldment 18 to provide a solid base for the fifth wheel hitch 10.

Figure 12:
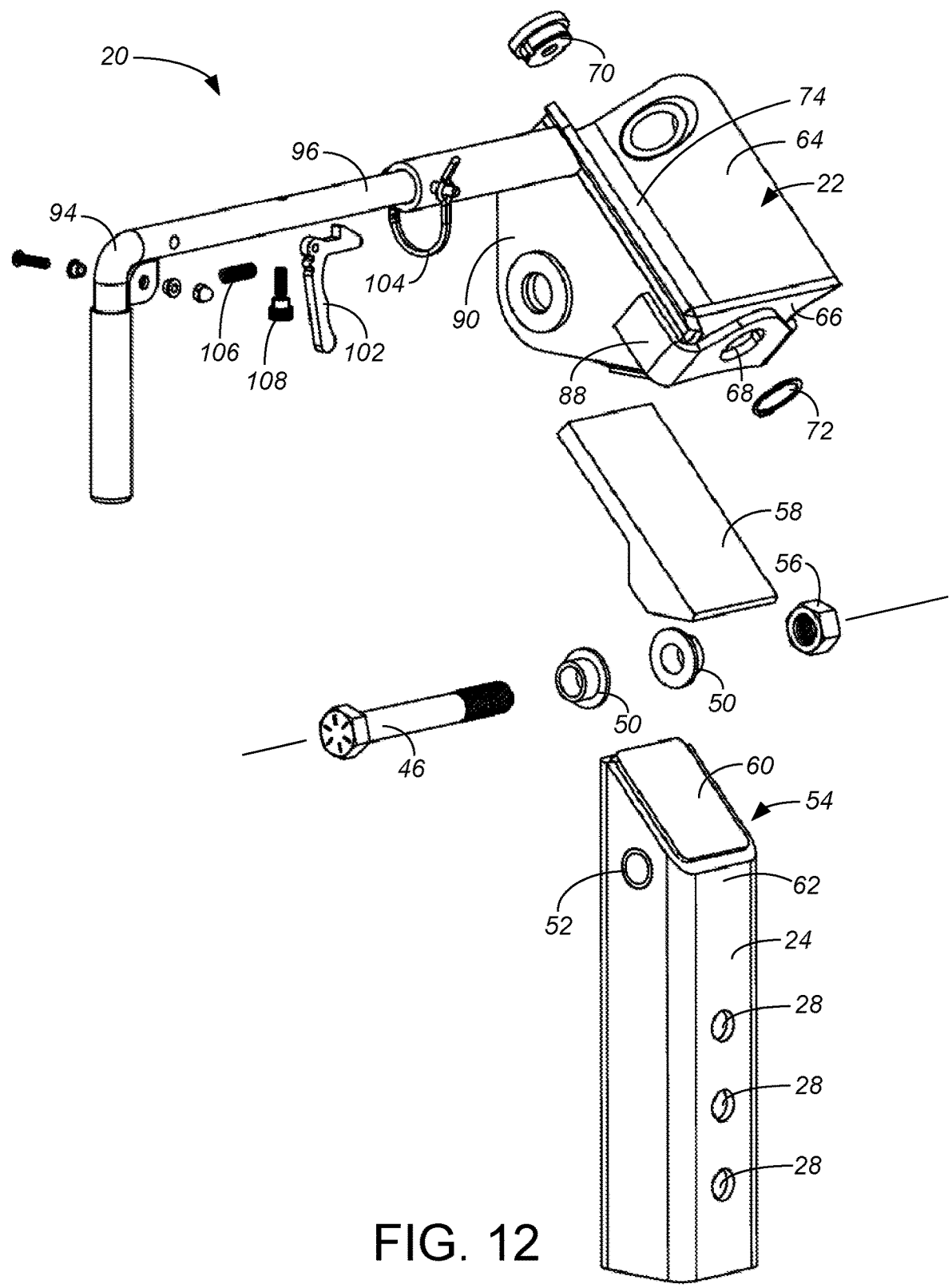
FIG. 12 is an exploded perspective view of the seat assembly of FIGS. 8-11.
Figure 13:
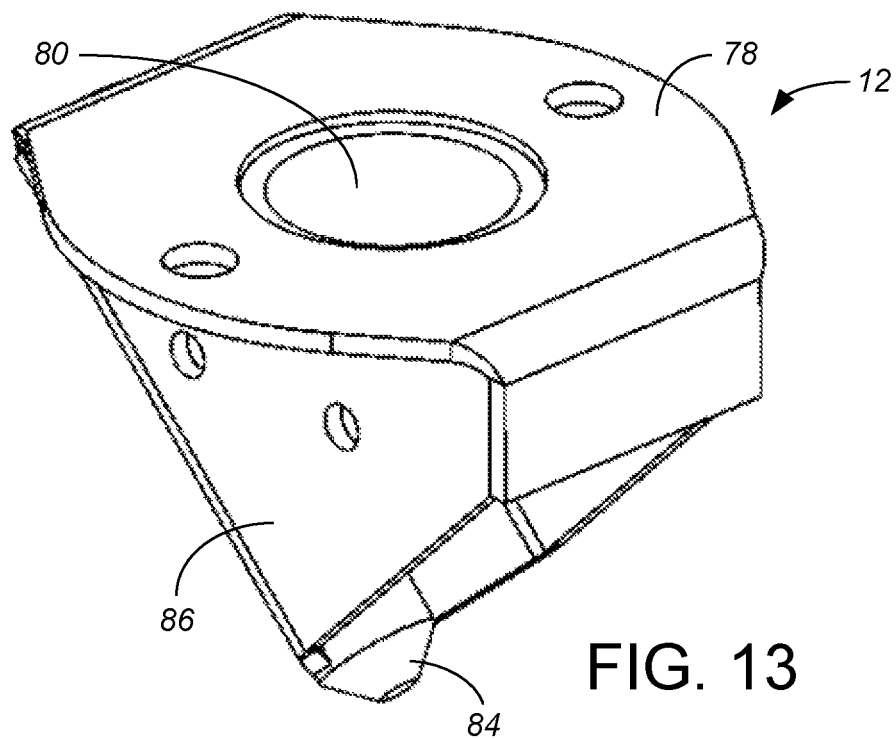
FIG. 13 is a perspective view of the kingpin adapter of the fifth wheel hitch of FIGS. 1-4 from the upper-rear-right.
Figure 14:
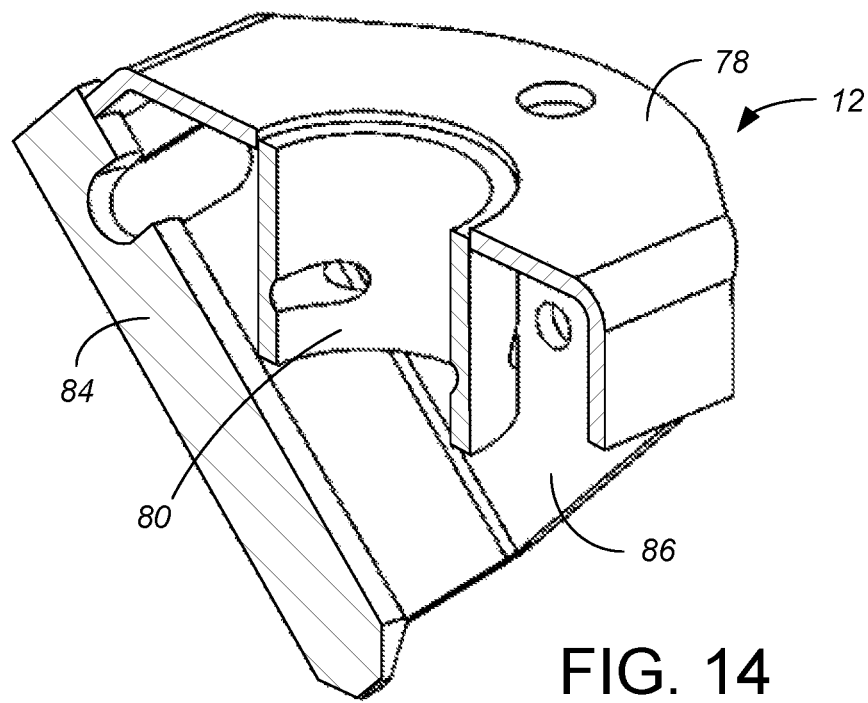
FIG. 14 is the perspective view of FIG. 13, vertically sectioned at the hitch longitudinal center plane.

The seat 22 is positioned at the top of the inner riser tube 24. In the preferred embodiment, the connection between the seat 22 and the inner riser tube 24 is provided by a pivot bolt 46 defining a transverse pivot axis 48, received within two separate outer stainless steel bushings 50 in the seat 22 and a bushing tube 52 secured as part of the riser tube weldment 54, and secured by a nut 56. A compressible pad 58, best shown in FIG. 12, is provided between the seat 22 and a top plate 60 of the riser tube weldment 54, compression of which resiliently resists pivoting between the seat 22 and the inner riser tube 24. Pivoting between the seat 22 and the riser tube weldment 54 causes compression of one or the other side of the pad 58. The fifth wheel hitch 10 provides pitch (primarily) and roll (slightly) flexibility through compression of the pad 58. The tongue weight of the trailer, which is not centered over the transverse pivot axis 48, also causes compression of the pad 58. The preferred pad 58 is formed of cast polyurethane having a durometer in the range of about 85-95 Shore A, and having a thickness of about 0.5 inches (13 mm) or more for most of its area. In the most preferred embodiments, the compressible insert 58 engages with a vertical side surface 62 of the inner riser tube 24 as well as the angled top plate 60 of the riser tube weldment 54. The teachings of U.S. patent application Ser. No. 16/534,808 pertaining to the use of compressible pads in hitches are incorporated by reference.

The seat 22 preferably includes two top plates 64 arranged to generally make a "V" with respect to each other, with upwardly exposed faces. The upwardly exposed faces of the top plates generally define a mouth which narrows in the longitudinal direction of the fifth wheel hitch, preferably wider at the back than at the front. The lower and rearward ends of the top plates 64 are bridged by a rear plate 66 which provides a rod socket opening 68 for a pin support bushing 70. The pin support bushing 70 can be retained in position using a retaining ring 72. The retaining ring connection allows the pin support bushing 70 to be formed of a different material than the remainder of the seat 22, such as forming most of the seat 22 by welding together forms cut from 0.25 inch (6 mm) thick carbon steel plate stock, but machining the pin support bushing 70 out of stainless steel. The retaining ring connection also allows ready replacement of the pin support bushing 70 (such as if the pin support bushing 70 should become damaged or marred if the weight of the fifth wheel trailer is dropped too quickly onto the seat 22). In the first preferred embodiment, the two top plates 64 are provided by a single piece of plate metal cut and bent into a lower pin support 74, which is welded to the rear plate 66. In general, the lower pin support 74 and the rear plate 66 jointly define an upper surface in the overall shape of an upside-down, triangular pyramid, with the pin support bushing 70 near the bottom or apex of the upside-down, triangular pyramid. For proper hitching connection as will be explain with reference to FIG. 15, it is important that some portion of the top plates 64 extend higher than the top height of the rear plate 66. For instance, the uppermost corners of the top plates 64 are at a height $h_1$ (called out in FIGS. 9 and 15) above the top height of the rear plate 66, with the "V" vertex extending to a height $h_2$ (called out in FIGS. 10 and 15) above the top height of the rear plate 66. The heights $h_1$ and $h_2$ end up defining the targeting elevation margin of error for the kingpin 14 relative to the fifth wheel hitch 10, and should each be at least about one inch (25 mm). In the preferred embodiments, $h_1$ is about 4.4 inches (110 mm) and $h_2$ is about 3.2 inches (80 mm). The top plates 64 have an overall width w (called out in FIG. 9) which ends up defining the targeting right-to-left margin of error for the kingpin axis 76 relative to the fifth wheel hitch centerline, and should also be at least about one inch (25 mm). In the preferred embodiments, w is about 5.5 inches (140 mm).

The top of the kingpin adapter 12 includes a skid plate 78 with a generally horizontal, planar upper surface and a vertically-oriented kingpin tube 80 defining a central hole in the skid plate 78 and preferably fully encircled by the skid plate 78. During use, the kingpin 14 of the trailer is secured within the kingpin tube 80, such that the kingpin axis is coincident with the kingpin tube axis 76, and with a bottom plate of the trailer pin box on top of the skid plate 78. However, the attachment of the kingpin 14 to the kingpin adapter 12 still allows the kingpin adapter 12 to rotate or pivot about the kingpin tube axis 76 relative to the kingpin 14. The fifth wheel hitch 10 allows rotational pivoting about the kingpin axis (during turning of the truck while towing) because two bolts 82 through the upper weldment 12 are not received in bolt holes of the kingpin 14, but instead merely ride in the notch of the kingpin 14 so as to prevent vertical separation. In other words, the two bolts 82 through the upper weldment 12, together with the vertical assembly with the kingpin 14 through the kingpin tube 80, serve the function typically provided by jaws of prior art fifth wheel hitches.

The bottom of the kingpin adapter 12 includes a bearing pin 84 and two side plates 86 which jointly define an overall shape of another upside-down, triangular pyramid. The side plates 86 can be formed from 0.25 inch (6 mm) thick low alloy, medium tensile strength plate steel, and the bearing pin 84 machined out of a similar steel material. When used during towing, the bottom pyramidal shape of the kingpin adapter 12 rests upon and within the top pyramidal shape of the seat 22, but the corresponding pyramidal shapes do not allow 360° rotational between the kingpin adapter 12 and the seat 22. A primary purpose of the kingpin adapter 12 is to change the shape of the bottom of the kingpin 14—which has a flat, circular horizontal surface perpendicular to the kingpin axis 76—into a shape that is more pointed.

Figure 15:
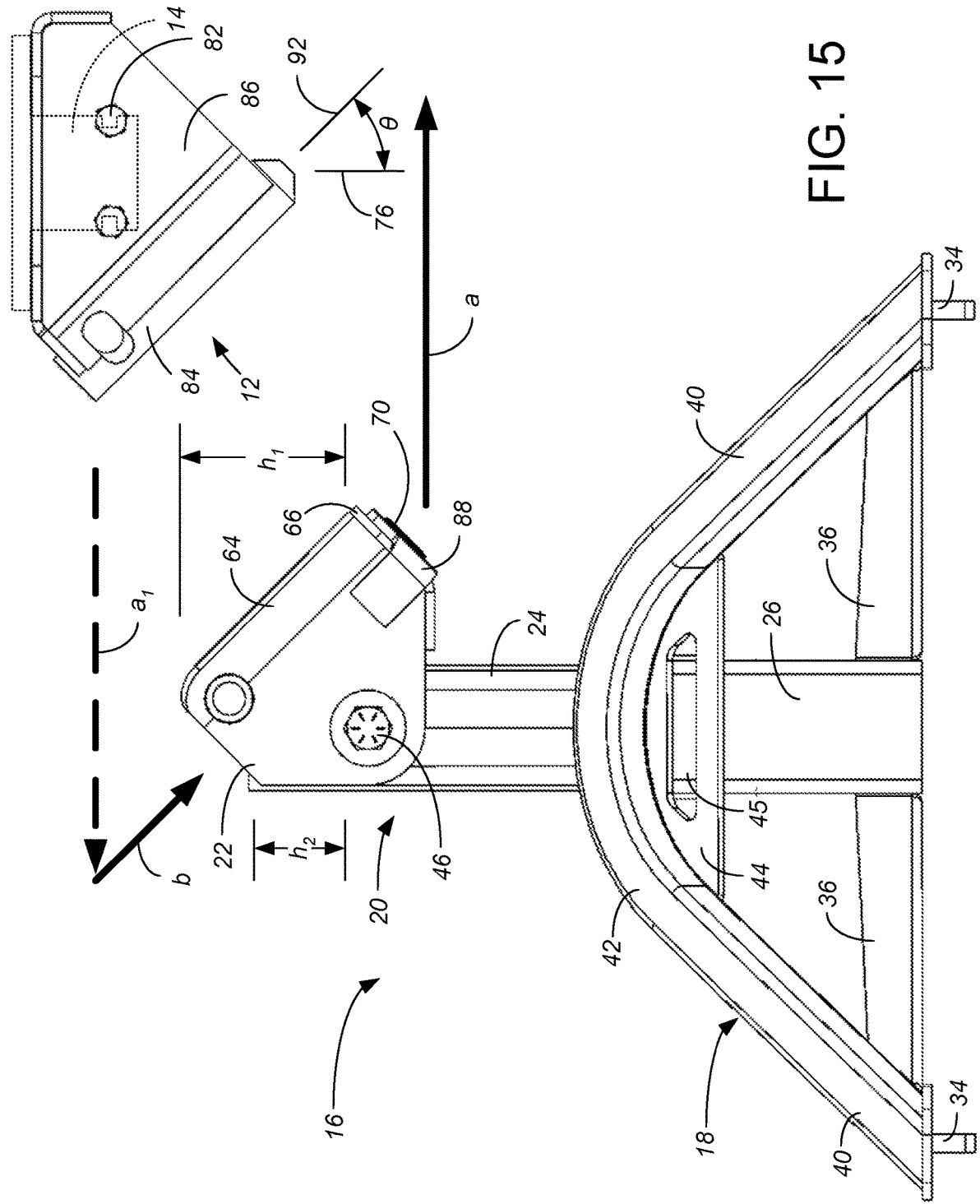
FIG. 15 is a side view of the fifth wheel hitch of FIGS. 1-4, showing relative movement during hitching of a kingpin to the towing vehicle.

The bearing pin 84 includes a conical lower end which, during use, rests within a conical shape of the pin support bushing 70. Because a significant portion of the trailer tongue weight is transmitted from the conical lower end of the bearing pin 84 to the pin support bushing 70, the rear plate 66 can be further supported relative to the top plates 64 with a bushing strap 88 welded to side plates 90 of the seat 22. The bearing pin 84 extends along an axis 92, which is at an angle θ relative to the vertical kingpin tube axis 76 as shown in FIG. 15. This angle θ should be greater than 0°, but still sufficiently below 90° to enable sliding between the kingpin adapter 12 and the seat 22, such as an angle θ within the range of 30-60°. In the most preferred embodiments, the angle θ is 45°. The conical shape of the pin support bushing 70 preferably has a central hole therethrough, which helps avoid the possibility of precipitation accumulation in the pin support bushing 70 and in the bottom of the pyramidal shape defined by the seat 22.

The radius of the bearing pin 84 roughly matches the inside radius of curvature of the "V" vertex bend between the two top plates 64, which in the most preferred embodiments is about 1.5 inches (38 mm). The "V" shape of the seat 22 defines a seat angle α defined between the two top plates 64 which is a preferably a little greater than the kingpin adapter bottom angle β defined between the two side plates 86 of the kingpin adapter 12, both called out in FIG. 4 when looking down the bearing pin axis 92. The difference between the angles α and β allows the kingpin adapter 12 to pivot about the bearing pin axis 92 relative to the seat 22, which is not required but better supports undulating road beds when the roll angle of the trailer might differ from the roll angle of the towing vehicle. Both the angles α and β should be in the range of 30-150°, and the difference between angles α and β should be in the range of >0°-60°. In the most preferred embodiment depicted in FIG. 4, angle α is 90° and angle β is 80°, so the difference between angles α and β is 10°. When compounded through the angle θ of 45°, this difference between angles α and β of 10° enables the trailer to have a roll angle of about +−3.5° relative to the towing vehicle taken up by pivoting of the kingpin adapter 12 relative to the seat 22 about the pin axis 92 and some pivoting about the pivot axis 48, and without any additional bending stresses on the fifth wheel hitch 10 or the trailer tongue.

After the kingpin adapter 12 is in the correct hitching position with the lower end of the bearing pin 84 within the pin support bushing 70, the kingpin adapter 12 is held within the seat 22 by the handle weldment 94. The handle weldment 94 includes a horizontal bar 96, slidable along its longitudinal axis, and extending over the bearing pin 84 between a long handle support tube 98 and a short handle support tube 100 of the seat weldment 22. The hitch 10 can include a mechanism which fixes the longitudinal position of the handle weldment 94, such as a trigger mechanism 102 and/or a lock pin 104. The trigger 102 and wire-lock pin 104 prevent unintentional removal of the handle weldment 94. To unhitch the trailer from the towing vehicle, when the lock pin 104 is removed and the trigger 102 is pulled to overcome a spring 106 and remove that trigger pawl out of a notch in the long handle support tube 98, the handle weldment 94 can be pulled longitudinally to unsecure the kingpin adapter 12 from the seat 22. The long handle support tube 98 can include a slot 107, and the handle can include a shoulder screw 108 sliding within the slot 107, with the interaction between the shoulder screw 108 and the slot 107 preventing the handle from being fully removed from the fifth wheel hitch 10.

The kingpin adapter 12 is preferably attachable to a kingpin 14 in a fashion which allows relative rotation and which can remain attached over many hitchings and unhitchings but is still removable. To achieve such an attachment, the preferred embodiments include two openings through the kingpin tube 80 and through side plates 86 of the kingpin adapter 12. Once properly positioned with the kingpin 14 down into the kingpin tube 80, two horizontally-extending bolts 82 are used to secure the kingpin 14 into the kingpin adapter 12 but still allow rotation. The bolts 82 are preferably then secured with threaded lock nuts 83.

Installation and use of the inventive fifth wheel hitch 10 proceeds as follows. The base assembly 16 is mounted into the bed of the pickup truck as known in the art, such as by securing base rails (not shown) into the bed of the truck (not shown) and securing the feet 34 of the base assembly 16 to the base rails. The kingpin adapter 12 is attached to the kingpin 14 of the trailer by removing the two horizontal bolts 82 and then pushing the upper weldment 12 vertically upward from below onto the kingpin 14, holding the upper weldment 12 in position while the two horizontal bolts 82 are reinserted and lock nuts 83 tightened so as to hold the upper weldment 12 to the kingpin 14. Once thus assembled onto the kingpin 14, the upper weldment 12 can remain on the kingpin 14 indefinitely during both connected towing and disconnected stationary use of the fifth wheel trailer. The upper weldment 12 thereafter acts as a kingpin-hitch adapter during towing connection/disconnection.

The towing elevation of the seat 22 relative to the kingpin 14 and attached kingpin adapter 12 is selected by the user via the bolt connection between one of the multiple vertical holes 28 through the riser tube weldment 54 relative to the base weldment 18. In general, the trailer will be stationary with its leading end supported on one or more jacks. As best indicated in FIG. 15, the trailer tongue needs to be held by the trailer's jack at an elevation relative to the seat 22 that places the bottom of the kingpin adapter 12 higher than the top height of the rear plate 66, preferably within the height $h_1$ and more preferably within the height $h_2$.

The pickup truck, perhaps with its tailgate open, will usually be backed up toward the fifth wheel trailer, so as to generally align the kingpin 14 and attached kingpin adapter 12 on the center line of the truck and the center line of the base assembly 16 of the hitch 10, or more particularly such that the kingpin axis/kingpin tube axis 76 is within the width w. The bearing pin 84 of the kingpin adapter 12 should be generally pointed forward, but, noting in particular that the kingpin adapter 12 can rotate on the kingpin 14 during use, its directional orientation need not be precise. The pickup truck is driven further backwards as indicated by arrow a in FIG. 15. This causes the kingpin adapter 12 to move forwardly relative to the base assembly 16 as shown by arrow $a_1$, preferably until the kingpin adapter 12 makes contact with the seat 22. If the pickup truck is then slowly backed further, the bottom of the kingpin adapter 12 mates with the seat 22 such that the mouth of the seat 12 can cause pivoting rotation of the kingpin adapter 12 when the base assembly 16 is moved in the longitudinal direction relative to the kingpin adapter 12. The pivoting rotation of the kingpin adapter 12 is easily noticeable by the driver, who then knows to stop further backup the towing vehicle. Alternatively, if the pickup truck is stopped before or at the point of contact, but with the bottom of the kingpin adapter 12 vertically above the seat 22, lowering of the trailer tongue will initiate contact between the seat 22 and the kingpin adapter 12 which causes the kingpin adapter 12 to rotate into aligned position relative to the seat 22 due to the interaction between the two pyramidal shapes. If either the longitudinal movement of the pickup truck relative to the trailer or the lowering of the trailer tongue occurs smoothly, there will be sliding contact aligning the kingpin adapter 12 relative to the seat 22.

It will be thus be understood that the outwardly/upwardly/forwardly sloped walls of the lower pin support 74 of the seat 22 relative to the sloping of the bearing pin 84 and the side plates 86 of the kingpin adapter 12 allow a significant margin of error in aligning the kingpin 14 over the riser tube 24. The inventive system allows the driver to merely back up until the seat 22 makes some sort of contact around the kingpin adapter 12 on the kingpin 14, or, more precisely, until the bottom of the pyramidal shape of the kingpin adapter 12 is over at least some part of the footprint of the pyramidal shape of the seat 22. There is no need for precise longitudinal, transverse and elevational alignment between the kingpin 14 and the riser tube 24 at this stage (prior to lowering the jack(s)). Often the driver can achieve sufficient alignment on a first try without assistance from someone helping guide the driver/towing vehicle into position. Further, the designer of the hitch 10 can increase or decrease the margin of error simply by increasing or decreasing the w, $h_1$ and $h_2$ dimensions on the seat 22; a seat with larger w, $h_1$ and $h_2$ dimensions can be provided and sold to drivers that prefer a greater margin of error in alignment between the pickup truck and the trailer.

Once the pickup truck has been driven into its generally aligned position, the pickup truck can be temporarily parked. The driver or a helper can then work the jack crank to lower the kingpin 14. As the kingpin 14 is lowered, the kingpin adapter 12 may slide (and the attached fifth wheel trailer may roll or turn) slowly backward and/or sideways until the tongue weight of the fifth wheel trailer seats the pin of the kingpin adapter 12 relative to the pin bearing of the seat 22, with such sliding movement being indicated by arrow b in FIG. 15. The sloped interaction between the upper weldment 12 and the lower weldment during lowering of the jack(s) causes more precise longitudinal and/or transverse alignment between the kingpin 14 and the riser tube 24.

Once the full tongue weight is being supported by the fifth wheel hitch 10, the handle weldment 94 is longitudinally advanced, through the side walls 86 and preferably within a notch in the bearing pin 84 of the kingpin adapter 12, and out the short tube support 100 of the seat weldment 22. FIGS. 1-6 thus show the fifth wheel hitch 10 in its fully connected state, in which a) the bar 96 of the handle weldment 94 rides over and within the 0.875 inch (22 mm) notch in the bearing pin 84 of the kingpin adapter 12, together with b) the bottom conical end of the bearing pin 84 of the kingpin adapter 12 being within the conical upper surface of the pin support 70. The handle 94 and the pin support 70 collectively hold the kingpin adapter 12 relative to the seat 22, while still permitting slight (within the difference between angles α and β) roll pivoting of the kingpin adapter 12 about the pin axis 92 relative to the seat 22, and also while permitting pitch pivoting about the pivot axis 48 through compression of the pad 58.

Figure 16:
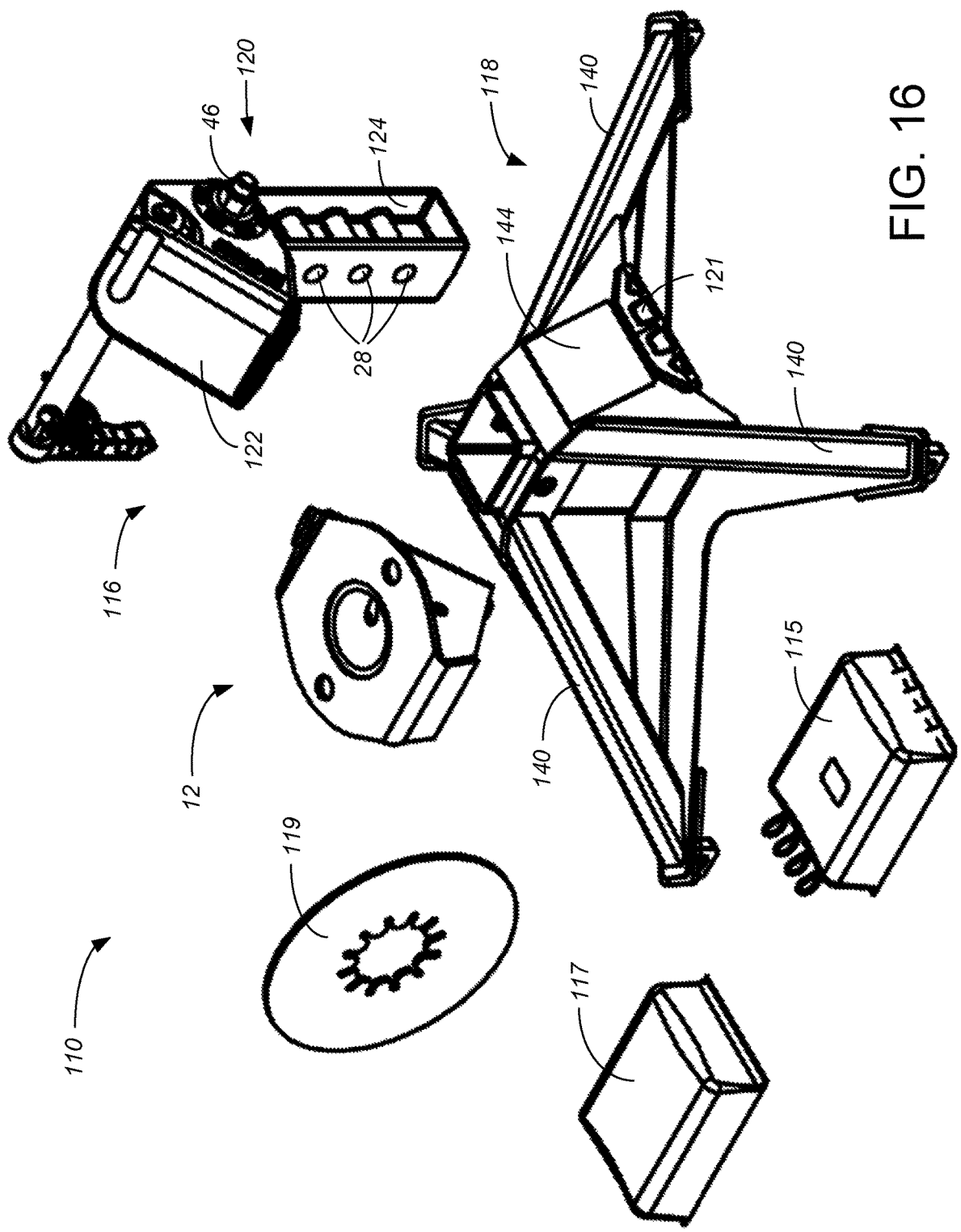
FIG. 16 is a perspective view, showing the unassembled components of a second embodiment of a fifth wheel hitch in accordance with the present invention.
Figure 17:
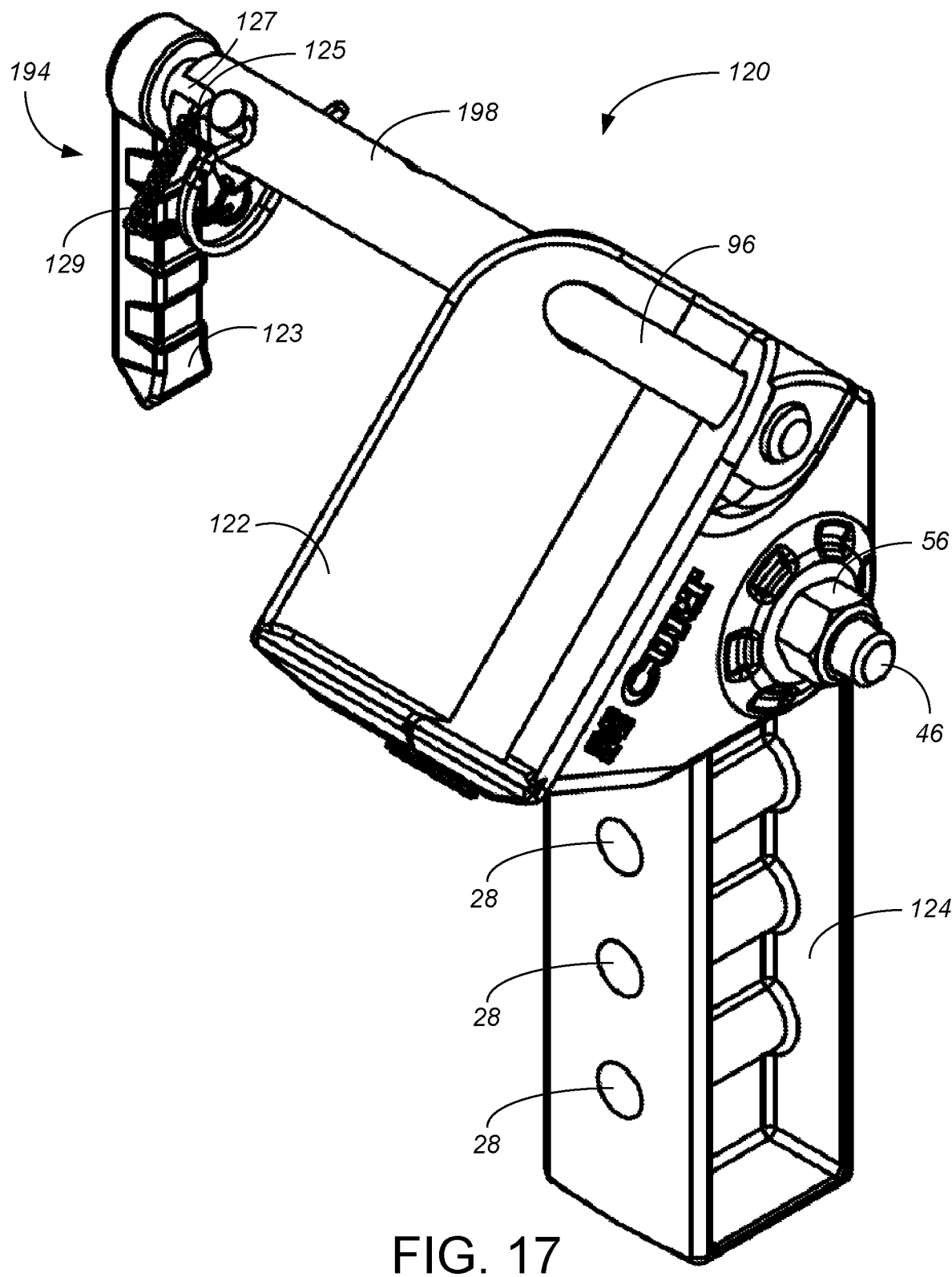
FIG. 17 is a perspective view, from the upper-rear-right, of the seat assembly of the fifth wheel hitch of FIG. 16.
Figure 18:
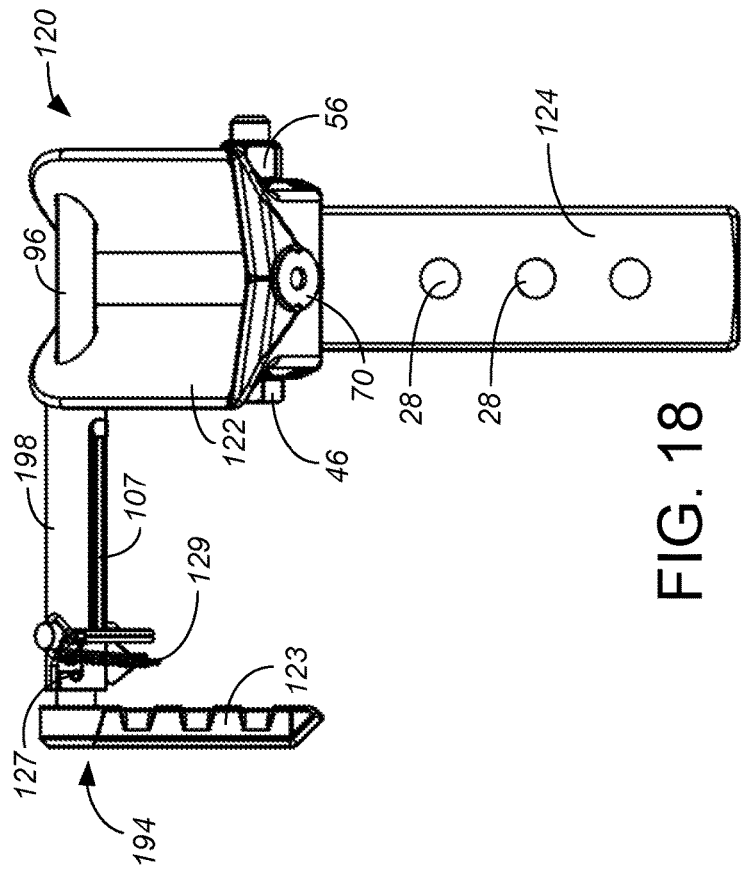
FIG. 18 is a rear elevational view of the seat assembly of FIG. 17.
Figure 19:
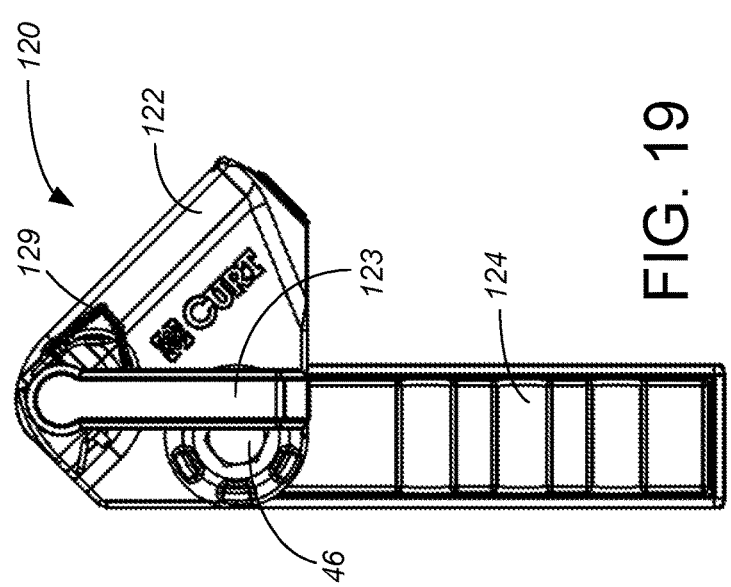
FIG. 19 is a side elevational view of the seat assembly of FIGS. 17 and 18.
Figure 20:
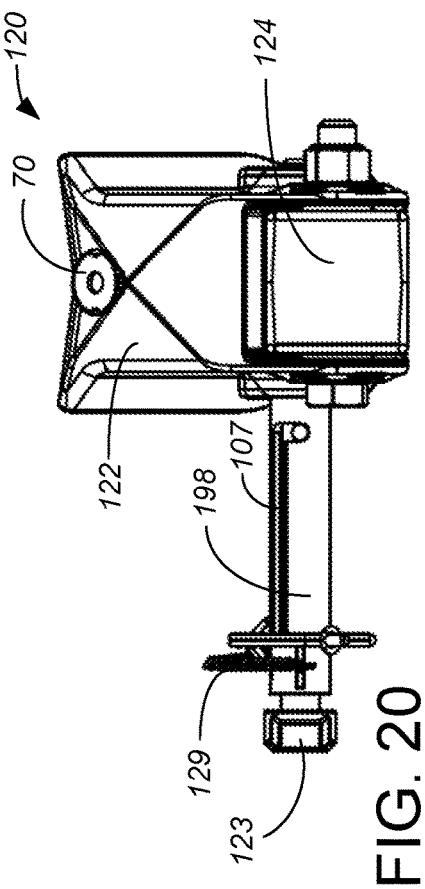
FIG. 20 is a plan view from below of the seat assembly of FIGS. 17-19.

FIGS. 16-20 depict a second embodiment 110 of the inventive hitch, with FIG. 16 showing the various component parts included when packaged and sold to a customer as a kit. The second embodiment 110 includes several changes to improve manufacturing efficiency and cost and improve ease of use. In addition to the base weldment 118, the seat assembly 120 and the kingpin adapter 112, the kit includes a first hardware package 115 containing the hardware for attaching the base assembly 116 to the truck bed, and a second hardware package 117 including the elevation setting bolt 30 and the kingpin attachment bolts 82 and associated nuts 32, 83. A lube plate 119 is included, formed out of a lubricious material such as polyethylene. The seat assembly 120 can be provided to the customer assembled as shown.

The base weldment 118 of the second embodiment 110 differs from the base weldment 18 of the first embodiment 10 in two ways. The sloping arms 140 of the base weldment of the second embodiment 110 are provided as four separate tubes, eliminating the tube bending operation required for main body tubes 42 the first embodiment 10. Additionally, two polymer hand grips 121 are provided on opposing sides of the tube support plate 144 of the base weldment 118. The polymer hand grips 121 can be molded as two separate mating halves, connected by screws (not separately shown) extending through drilled holes (internal and therefore not shown) in the tube support plate 144. The molded hand grips 121 have an indentation pattern and a much thicker, more rounded shape that allows lifting of the base assembly 116 using the two hand grips 121 with less hand pain and less possibility of hand cuts on the edge of the tube support plate 144.

The seat assembly 120 of the second embodiment 110 differs from the seat assembly 20 of the first embodiment 10 in several ways. The riser 124 is not formed from a tube, but rather is a cast steel part more in the shape of an I-beam, still with holes 28 therethrough defined for the high, middle and low elevations. A hole for the pivot bolt 46 is still provided, but the bushing tube 52 is eliminated. The seat 122 is also not formed as a weldment but rather is formed as a cast steel part. The compressible pad (internal, therefore not shown) is shaped to more closely mate with the bottom shape of the seat 122. A handle grip 123 is provided separately from the longitudinal bar 96 of the handle 194, again as a cast steel part, but with an indentation pattern similar to the hand grips 121 of the base assembly 116. The handle grip 123 attaches to the longitudinal bar 96 with an internal compression spring (internal, therefore not shown), enabling the handle grip 123 to compress slightly inward relative to the longitudinal bar 96. The trigger 102 of the first embodiment is eliminated in favor a second set screw 125 riding in a second channel 127 in the long handle support tube 198, controlled by the handle grip 123. In order to remove the handle 194 from the seat 122, the handle grip 123 must be simultaneously compressed inward and rotated upward before the interaction between the second set screw 125 and the second channel 127 will enable the handle 194 to be pulled to the left out of the "V" of the seat 122. A chain 129 is used to prevent the handle 194 from being fully removed from the long handle support tube 98.

The inventive system still allows rotation about the traditional kingpin 14 with vertical load from the trailer being transmitted though a skid plate type of load-bearing connection, i.e., with rotational (during cornering) load-supporting contact occurring with the skid plate 78. As compared to many prior art systems, this reduces stress on the trailer's kingpin 14 and reduces wear. The additional lube plate 119 can be positioned on top of the skid plate 78, thereby further reducing friction and wear during cornering.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

The invention claimed is:

1. A fifth wheel hitch comprising:
   a base attachable to a towing vehicle so as to define a longitudinal direction of the fifth wheel hitch matching with the longitudinal direction the towing vehicle travels in forward and reverse;
   a seat attached at a top of the base, the seat having a mouth which narrows in the longitudinal direction of the fifth wheel hitch; and
   a kingpin adapter attachable relative to a kingpin of a towed vehicle, the kingpin adapter having a kingpin opening defining a generally vertical kingpin rotation axis which receives the kingpin so as to permit rotation of the kingpin adapter relative to the kingpin about the kingpin rotation axis, the kingpin adapter having a skid plate providing a top surface of the kingpin adapter around the kingpin opening, the kingpin adapter having a bottom extending downwardly lower than the skid plate;
   wherein the bottom of the kingpin adapter mates with the seat such that the mouth of the seat can cause pivoting rotation of the kingpin adapter when the base is moved in the longitudinal direction relative to the kingpin adapter.

2. The fifth wheel hitch of claim 1, wherein the bottom of the kingpin adapter comprises a bearing pin angled relative to the kingpin rotation axis, and wherein the seat comprises a pin support which, when the kingpin adapter is secured into the seat, makes supporting contact with the bearing pin.

3. The fifth wheel hitch of claim 2, wherein the bearing pin and the seat have mating conical bearing surfaces extending about a bearing pin axis.

4. The fifth wheel hitch of claim 3, wherein the conical bearing surface of the seat is provided by a pin support bushing formed of a different material than a remainder of the seat.

5. The fifth wheel hitch of claim 2, wherein the seat comprises top plates with upwardly exposed surfaces defining the mouth such that the mouth narrows forwardly and downwardly, and wherein the bottom of the kingpin adapter comprises side plates that narrow forwardly and downwardly.

6. The fifth wheel hitch of claim 5, wherein the top plates of the seat define a seat angle, wherein the side plates of the bottom of the kingpin adapter define a kingpin adapter bottom angle, and wherein the seat angle is greater than the kingpin adapter bottom angle.

7. The fifth wheel hitch of claim 1, wherein the seat is attachable at any of a plurality of elevations relative to the base and selectable by a user.

8. The fifth wheel hitch of claim 7, wherein the seat is mounted on an inner riser tube, and wherein the base comprises an outer tube sized to receive the inner riser tube in a telescoping fashion, and wherein the inner riser tube and the base comprise a plurality of bolt holes defining the selectable elevations of the seat relative to the base.

9. The fifth wheel hitch of claim 1, wherein the seat can pivot about a transverse pivot axis relative to the base.

10. The fifth wheel hitch of claim 9, further comprising a compressible pad disposed between the seat and the base which resists pivoting of the seat relative to the base.

11. The fifth wheel hitch of claim 1, wherein the bottom of the kingpin adapter defines a triangular pyramidal shape, and wherein a top of the seat defines a mating triangular pyramidal shape.

12. The fifth wheel hitch of claim 11, wherein the seat comprises two top plates with upwardly exposed surfaces and a rear plate, and wherein the two top plates and the rear plate define the mating triangular shape.

13. The fifth wheel hitch of claim 1, wherein the skid plate fully encircles the kingpin rotation axis.

\* \* \* \* \*